US012607538B2

(12) United States Patent
Chen et al.

(10) Patent No.: US 12,607,538 B2
(45) Date of Patent: Apr. 21, 2026

(54) METHOD OF SELECTING OPTIMIZED MULTIMODE OPTICAL FIBERS

(71) Applicant: CORNING INCORPORATED, Corning, NY (US)

(72) Inventors: Xin Chen, Painted Post, NY (US); Kangmei Li, San Jose, CA (US); Ming-Jun Li, Horseheads, NY (US); Simit Mayank Patel, Greensboro, NC (US)

(73) Assignee: CORNING INCORPORATED, Corning, NY (US)

( * ) Notice: Subject to any disclaimer, the term of this patent is extended or adjusted under 35 U.S.C. 154(b) by 889 days.

(21) Appl. No.: 17/945,568

(22) Filed: Sep. 15, 2022

(65) Prior Publication Data

US 2023/0110293 A1 Apr. 13, 2023

Related U.S. Application Data

(60) Provisional application No. 63/248,708, filed on Sep. 27, 2021.

(51) Int. Cl.
*H04B 10/12* (2006.01)
*G01M 11/02* (2006.01)
(52) U.S. Cl.
CPC .................................. *G01M 11/02* (2013.01)
(58) Field of Classification Search
CPC .......... H04B 10/2581; H04B 10/07951; H04B 10/40; H04B 10/2513; H04B 10/2507; H04B 10/0795; G01M 11/02; G01M 11/30; G01M 11/338; G02B 6/028; G02B 6/0288

USPC ....... 398/143, 141, 142, 147, 158, 159, 135, 398/136, 137, 138, 139, 79, 192, 193, 398/194, 81, 33, 38, 25, 26, 27; 385/122, 385/123, 124, 126, 127, 128; 356/73.1
See application file for complete search history.

(56) References Cited

U.S. PATENT DOCUMENTS

| | | | |
|---|---|---|---|
| 10,168,246 B2 | 1/2019 | Bickham et al. | |
| 2014/0318188 A1 | 10/2014 | Bowker et al. | |
| 2015/0333829 A1* | 11/2015 | Chen ...................... | G02B 6/268 |
| | | | 398/143 |

(Continued)

OTHER PUBLICATIONS

Denis Molin, et al., "WideBand OM4 Multi-Mode Fiber for Next-Generation 400Gbps Data Communications", ECOC, 2014, pp. 1-3.

(Continued)

*Primary Examiner* — Hanh Phan
(74) *Attorney, Agent, or Firm* — Amy T. Lang

(57) ABSTRACT

A method of categorizing a group of multimode optical fibers, the method including comparing an effective modal bandwidth of a first multimode optical fiber with a first threshold, the first multimode optical fiber being in a group of multimode optical fibers meeting a first OM-standard and the first threshold being an effective modal bandwidth of the first multimode optical fiber. The method further including categorizing the first multimode optical fiber as meeting OM functional requirements of a second OM-standard if the effective modal bandwidth of the first multimode optical fiber is equal to or above the first threshold, wherein the second OM-standard is higher than the first OM-standard.

20 Claims, 11 Drawing Sheets

1

DETERMINE LINK BANDWIDTH FOR TRANSCEIVER DISTANCE
10

DETERMINE MINIMUM EMB VALUE FOR TRANSCEIVER DISTANCE
20

DETERMINE SUBSET OF FIBERS
30

(56)                    References Cited

U.S. PATENT DOCUMENTS

| | | | |
|---|---|---|---|
| 2015/0338578 A1* | 11/2015 | Bickham .............. | G02B 6/0365 |
| | | | 29/592.1 |
| 2017/0146428 A1* | 5/2017 | Bickham ............... | H04B 10/27 |
| 2019/0383999 A1 | 12/2019 | Abbott et al. | |

OTHER PUBLICATIONS

International Search Report and Written Opinion of the International Searching Authority; PCT/US22/43172; mailed on Jan. 12, 2023, 13 pages; European Patent Office.
Stefano Bottacchi, "MultiMulti-Gigabit Transmission Over Multimode Optical Fibre", Chapter 6, Wiley & Sons, 2006, pp. 275-306.

* cited by examiner

300

1000

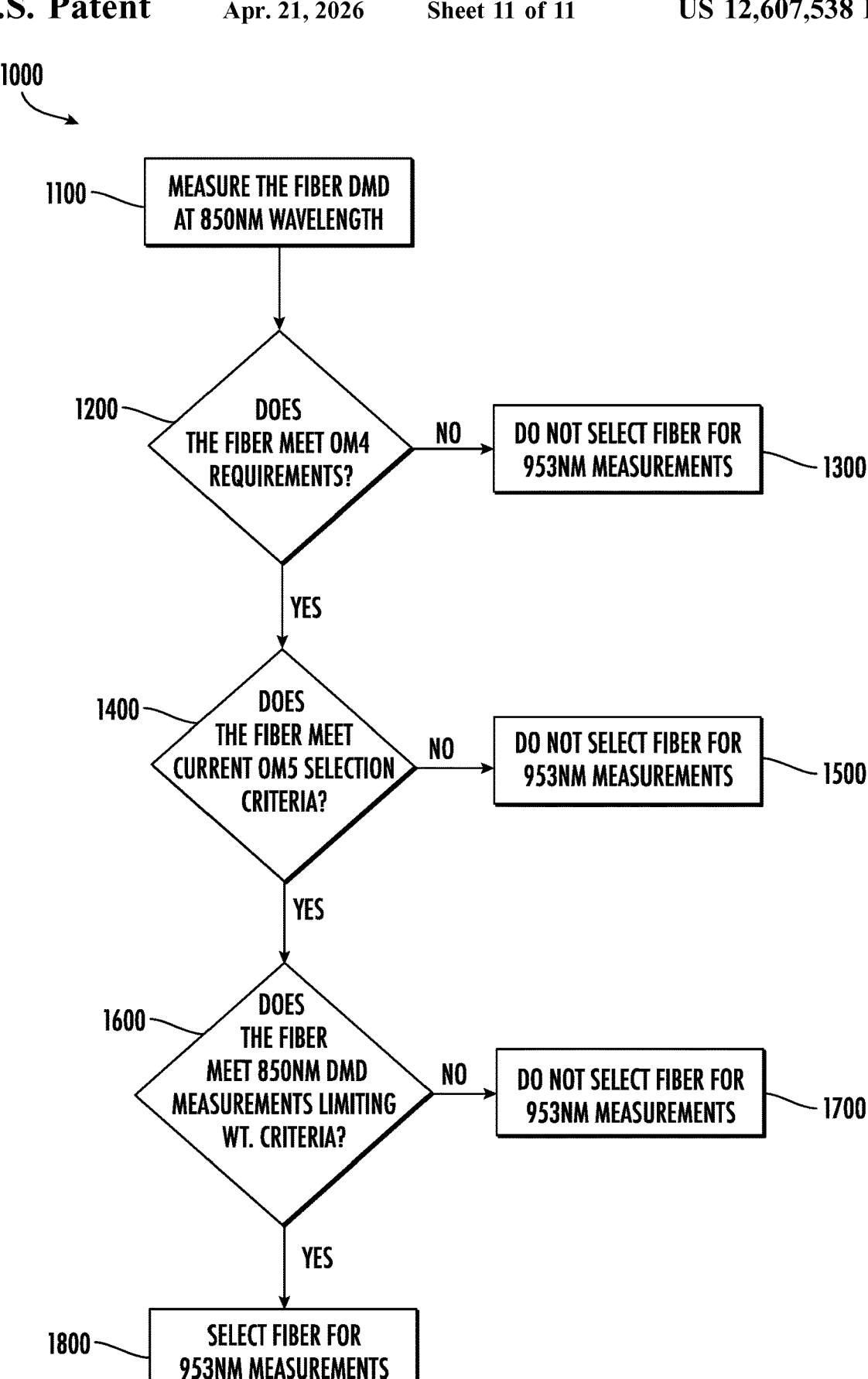

1100 — MEASURE THE FIBER DMD AT 850NM WAVELENGTH

1200 — DOES THE FIBER MEET OM4 REQUIREMENTS?

NO → DO NOT SELECT FIBER FOR 953NM MEASUREMENTS — 1300

YES

1400 — DOES THE FIBER MEET CURRENT OM5 SELECTION CRITERIA?

NO → DO NOT SELECT FIBER FOR 953NM MEASUREMENTS — 1500

YES

1600 — DOES THE FIBER MEET 850NM DMD MEASUREMENTS LIMITING WT. CRITERIA?

NO → DO NOT SELECT FIBER FOR 953NM MEASUREMENTS — 1700

YES

1800 — SELECT FIBER FOR 953NM MEASUREMENTS

FIG. 12

METHOD OF SELECTING OPTIMIZED MULTIMODE OPTICAL FIBERS

This Application claims the benefit of priority to U.S. Provisional Patent Application Ser. No. 63/248,708 filed on Sep. 27, 2021, the content of which is relied upon and incorporated herein by reference in its entirety.

FIELD OF THE DISCLOSURE

The present disclosure relates to optical fibers and in particular relates to systems and methods for selecting optimized multimode optical fibers.

BACKGROUND OF THE DISCLOSURE

Multimode optical fibers used with short-wavelength VCSELs (vertical cavity surface emitting lasers) have emerged as a dominant technology for short-reach, high data networks. Examples of such networks include office buildings and data centers. Single mode optical fibers can achieve much greater data rates and transmission lengths than multimode optical fibers. But a short-reach, high data network using single mode optical fibers requires that the fibers are coupled with lasers, splices, and connectors, thus resulting in a more expensive network than a short-reach, high data network using multimode optical fibers coupled with VCSELs. Furthermore, the higher data rates and transmission lengths achievable with single mode fibers are not required for short-reach, high data networks. So, multimode fibers provide an effective low-cost optical connectivity solution for such short-reach, high data networks.

Multimode fibers operating at 850 nm are currently a leading optical media used in short-reach, high data networks. Multimode fibers are classified under certain ISO standards based on the effective modal bandwidth (EMB), which is measured in units of frequency x distance, e.g., MHz·km. The classifications are referred to using the acronym OM ("optical multimode"), with the present OM standards being OM1, OM2, OM3, OM4, and OM5. Each OM standard has different physical characteristics (e.g., core radius, cladding radius, relative refractive index profile, etc) that result in different characteristics, including different EMB. It is noted that the OM5 standard includes all of the requirements of the OM4 standard, plus additional minimum bandwidth requirements at 953 nm.

SUMMARY OF THE DISCLOSURE

The present disclosure provides a selection method to identify multimode fibers that meet certain modal bandwidth requirements at long wavelengths (e.g. 910 nm, 953 nm) based on the measurements done at a short wavelength (e.g. 850 nm). The present disclosure also provides a selection method to identify OM3 fibers that meet certain modal bandwidth requirements at 850 nm and 910 nm so that they perform as OM4 or OM5 fibers for several types of transceivers. And, the present disclosure provides a selection method to identify OM4 fibers that meet certain modal bandwidth requirements at 910 nm so that they perform as OM5 fibers for several types of transceivers. Additionally, the present disclosure provides a selection method to effectively select OM5 standard fibers. In some embodiments, in order to determine the bandwidth capability of the multimode fibers, effective modal bandwidth is determined as a function of peak wavelength.

Aspects of the present disclosure include a method of categorizing a group of multimode optical fibers, the method comprising comparing an effective modal bandwidth of a first multimode optical fiber with a first threshold, the first multimode optical fiber being in a group of multimode optical fibers meeting a first OM-standard and the first threshold being an effective modal bandwidth of the first multimode optical fiber. The method further comprising categorizing the first multimode optical fiber as meeting OM functional requirements of a second OM-standard if the effective modal bandwidth of the first multimode optical fiber is equal to or above the first threshold, wherein the second OM-standard is higher than the first OM-standard.

Aspects of the present disclosure further include a method of categorizing a group of multimode optical fibers, the method comprising comparing an effective modal bandwidth of a first multimode optical fiber with a first threshold, the first multimode optical fiber being in a group of multimode optical fibers meeting a first OM-standard and the first threshold being an effective modal bandwidth of the first multimode optical fiber. The method further comprising categorizing the first multimode optical fiber as meeting OM standard requirements of a second OM-standard if the effective modal bandwidth of the first multimode optical fiber is equal to or above the first threshold, wherein the second OM-standard is higher than the first OM-standard.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

FIG. 12 provides an exemplary process for selecting a fiber, according to embodiments of the present disclosure.

DETAILED DESCRIPTION

Figure 1:
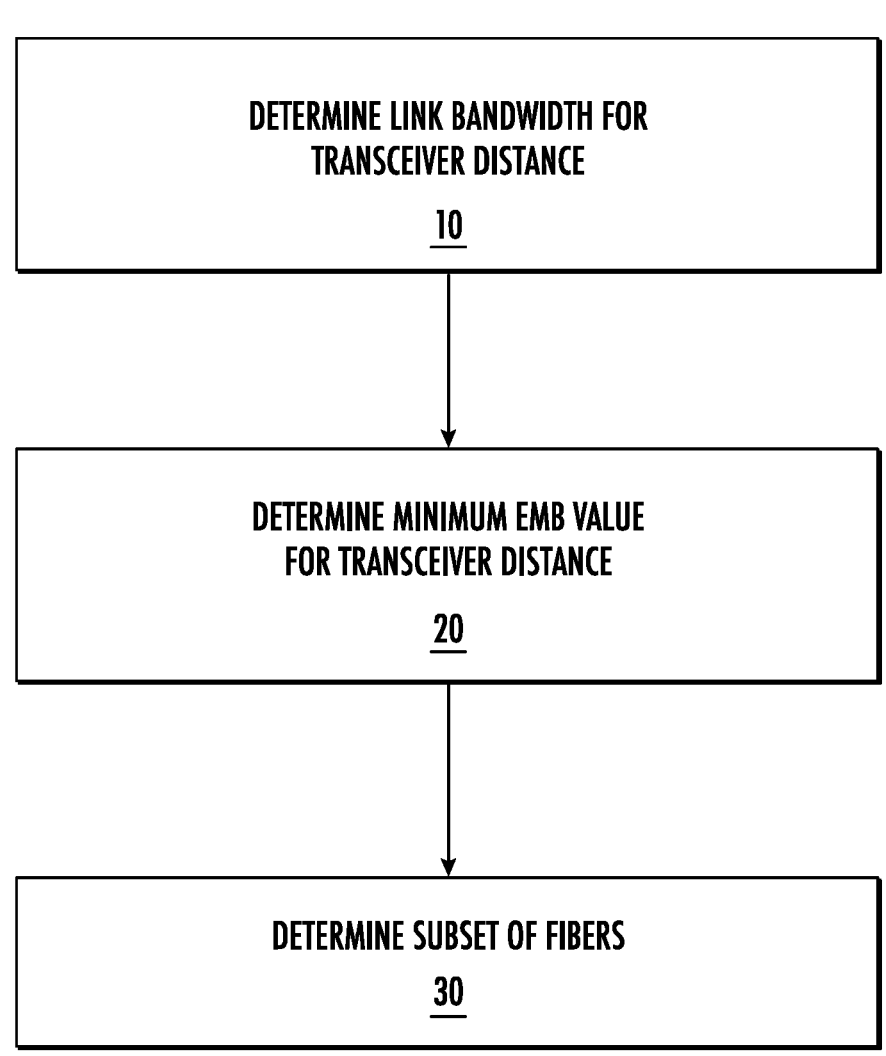
FIG. 1 provides an exemplary process for selecting an optimized multimode optical fiber, according to embodiments of the present disclosure.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

As used herein, "comprising" is an open-ended transitional phrase. A list of elements following the transitional phrase "comprising" is a non-exclusive list, such that elements in addition to those specifically recited in the list may also be present.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

The term "wherein" is used as an open-ended transitional phrase, to introduce a recitation of a series of characteristics of the structure.

Cartesian coordinates are used in some of the Figures for the sake of reference and ease of illustration and are not intended to be limiting as to direction or orientation. The z-direction is taken as the axial direction of the optical fiber.

The acronym VCSEL stands for "vertical cavity surface emitting laser."

The term "fiber" as used herein is shorthand for optical fiber.

The coordinate r is a radial coordinate, where r=0 corresponds to the centerline of the fiber.

The symbol "μm" is used as shorthand for "micron," which is a micrometer, i.e., $1 \times 10^{-6}$ meter.

The symbol "nm" is used as shorthand for "nanometer," which is $1 \times 10^{-9}$ meter.

The limits on any ranges cited herein are inclusive and thus to lie within the range, unless otherwise specified.

The terms "comprising," and "comprises," e.g., "A comprises B," is intended to include as a special case the concept of "consisting," as in "A consists of B."

The term "bandwidth" is denoted BW and as the term is used herein is the modal bandwidth. For purposes of this disclosure, the modal bandwidth is also the effective modal bandwidth and is also denoted EMB. The modal bandwidth is the capacity of an optical fiber measured in MHz·km or GHz·km. It is also noted that modal bandwidth is related to and exhibited by the differential mode delay (DMD) of a fiber. Actually, the EMB as defined by the standard is measured through the DMD measurement with calculations to obtain the EMB. When multiple modes of light travel through a multimode fiber, lower order modes travel through the fiber near its center core, while higher order modes travel closer to the outside edge of the core. As is known in the art, lower and higher order modes can travel at different velocities within the fiber, and the DMD is the difference in travel time between the different modes. The smaller the DMD, the less the light spreads out from the fiber and the higher the modal bandwidth. The EMB of a multimode fiber can be measured and calculated using the following standards: FOTP-220 (TIA-455-220-A), "Differential Mode Delay Measurement of Multimode Fiber in the Time Domain" (January 2003) and IEC 60793-1-41 Ed. 3.0: Optical fibres: Part 1-41: Measurement methods and test procedures—Bandwidth.

As used herein, "link bandwidth" is the overall bandwidth (i.e., effective system bandwidth), incorporating contributions from modal bandwidth and chromatic dispersion effects.

The "peak wavelength" is denoted herein as $\lambda_p$ and means a wavelength of light that maximizes the bandwidth BW of the multi-mode optical fiber. Techniques for measuring the peak wavelength $\lambda_p$ of a multimode optical fiber based on multi-wavelength measurement techniques and differential mode delay techniques are known in the art and are described, for example, in U.S. Publication No. 2014/0318188, entitled "Methods for modifying multi-mode optical fiber manufacturing processes," which is incorporated by reference herein. The peak wavelength is also sometimes denoted in the art as "$L_p$" or "lambda_p."

The peak bandwidth is denoted $BW_p$ and is the highest bandwidth a fiber can reach. The peak bandwidth occurs at $\lambda=\lambda_p$.

Chromatic dispersion is the sum of the material dispersion, waveguide dispersion, and inter-modal dispersion of the fiber. In the case of a single mode waveguide fiber, the inter-modal dispersion is zero. The zero dispersion wavelength ($\lambda_0$) is the wavelength at which the dispersion has a value of zero. Chromatic dispersion slope is the rate of change of the dispersion with respect to wavelength. Chromatic dispersion and dispersion slope are reported herein at a wavelength of 1550 nm and are expressed in units of ps/nm·km and ps/nm²·km, respectively.

Multimode optical fibers can be produced to have a bandwidth BW exceeding a bandwidth threshold at a peak wavelength $\lambda_p$. In some embodiments, the peak wavelength $\lambda_p$ may be between 780 nm and 1650 nm. In some embodiments, the peak wavelength $\lambda_p$ is 875 nm, 880 nm, 980 nm, or 1060 nm. In some embodiments, the peak wavelength $\lambda_p$ is between 1260 nm and 1360 nm, such as between 1300 nm and 1320 nm. However, it should be understood that multimode optical fibers can be produced to have any reasonable peak wavelength $\lambda_p$.

An OM4-grade multimode optical fiber is defined to have an EMB of at last 4700 MHz·km at 850 nm. An OM5-grade multimode optical fiber must further have an EMB of at last 2470 MHz·km at 953 nm. The modal bandwidth of multimode optical fibers is wavelength dependent and is generally peaked at a certain wavelength $\lambda_p$. Due to material dispersion, the peak modal bandwidth of multimode optical fibers decreases from this peak value when the wavelength moves away from the peak wavelength.

Multimode transceivers that couple multiple wavelengths into a single multimode optical fiber include 100G BiDi, 400G SR4.2, 100G SR4, and 400G SR8 transceivers. These transceivers each utilize one or more wavelengths including 850 nm and/or 910 nm.

Aspects of the present disclosure are directed to categorizing and selecting from a group or set of like multimode optical fibers (e.g., fibers belonging to a select OM-standard) those multimode optical fibers that meet bandwidth requirements based upon first and second wavelengths. In particular, the first wavelength is a short wavelength $\lambda_S$ and the second wavelength is a long wavelength $\lambda_L$. In some embodiments the short wavelength $\lambda_S$ is 850 nm and the long wavelength $\lambda_L$ is 910 nm or 953 nm. However, it is also contemplated that other wavelengths can be used for the short and/or long wavelengths. Furthermore, it is also contemplated, based upon the transceiver used, only the short $\lambda_S$ or long wavelength $\lambda_L$ is used to determine the bandwidth requirement. Next, the bandwidth requirement $BW_R$ is determined, as discussed further below, using the short wavelength $\lambda_S$ and/or the long wavelength $\lambda_L$. Then is it determined which fibers in the group or set of like multimode fibers are optimized based upon the bandwidth requirement $BW_R$. The optimized multimode fibers meet the functional and/or standard requirements of a higher and more rigorous OM standard. The OM functional requirements refer to the OM standards using a specific transceiver, while the OM standard requirements refer to the OM ISO classification standards (which are not dependent on a specific transceiver). In some embodiments, the functional requirements of the higher OM standard include distance and transceiver reach requirements.

Embodiments of the present disclosure provide a screening process to determine which fibers of the group or set of like multimode fibers are optimized for a more rigorous and higher OM-standard and which are not. For example, the OM5 standard is a higher and more rigorous standard than both of the OM4 and OM3 standards. And, the OM4 standard is a higher and more rigorous standard than the OM3 standard.

The bandwidth requirement $BW_R$ is determined from the minimum EMB transceiver reach. In a first embodiment, link bandwidth is used for this determination since link bandwidth takes into account modal bandwidth and chromatic dispersion. Equation (1) below is a bandwidth curve-fitting equation that describes the relationship between the link bandwidth BW and the effective modal bandwidth of a multimode optical fiber:

$$BW = 1/\left[ z \cdot \sqrt{\frac{1}{EMB^2} + 28.4777 \cdot CD^2 \cdot \Delta\lambda^2} \right] \tag{1}$$

where z is the fiber length (km), EMB is the effective modal bandwidth of the fiber (MHz·km), CD is the chromatic dispersion of the fiber (ps/nm/km), and $\Delta\lambda$ is the linewidth of the transceiver used with the fiber.

In order to calculate the link bandwidth (BW), the standard EMB values for OM3, OM4, and OM5 optical fibers are first used for the effective modal bandwidth (EMB) in equation (1). These standard values are shown below in Table 1, as found in the IEEE 400GBASE-SR4.2 standard ratified in June 2018. It is noted that the below standard EMB values are calculated for use with BiDi and SR4.2 transceivers, which have wavelengths of 850 nm and 910 nm. Therefore, 850 nm is used as the short wavelength $\lambda_S$ and 910 nm is used as the long wavelength $\lambda_L$.

TABLE 1

| Wavelength | EMB (MHz · km) | | |
|---|---|---|---|
| (nm) | OM3 Fiber | OM4 Fiber | OM5 Fiber |
| 850 | 2000 | 4700 | 4700 |
| 910 | 1260 | 1980 | 3100 |

In equation (1), the chromatic dispersion (CD) values for OM3, OM4, and OM5 are for standard optical fibers and are shown below in Table 2, which are measured as specified in IEC 60793-1-42.

TABLE 2

| Wavelength | Chromatic Dispersion (ps/nm · km) | |
| --- | --- | --- |
| (nm) | OM3/OM4 Fiber | OM5 Fiber |
| 850 | −103.62 | −98.49 |
| 910 | −78.86 | −75.19 |

Therefore, the effective modal bandwidth (EMB) and chromatic dispersion (CD) values in Tables 1 and 2 are inserted into equation (1) for wavelengths of 850 nm and 910 nm, along with the linewidth (Δλ) to determine the link bandwidth (BW). As discussed above, 850 nm is used as the short wavelength $\lambda_S$ and 910 nm is used as the long wavelength $\lambda_L$ in these calculations. In a first embodiment, the linewidth (Δλ) is calculated using a 100G BiDi transceiver or a 400G SR4.2 transceiver, each of which has a linewidth (Δλ) of 0.65 nm. With these transceivers, OM3 fibers are able to reach 70 m, OM4 fibers are able to reach 100 m, and OM5 fibers are able to reach 150 m. Therefore, the fiber length (z) in equation (1) is 70 m, 100 m, and 150 m for each of the respective OM standards. The results are shown below in Table 3.

TABLE 3

| Wavelength | Link Bandwidth (GHz) | | |
| --- | --- | --- | --- |
| (nm) | 70 m OM3 Fiber | 100 m OM4 Fiber | 150 OM5 Fiber |
| 850 | 23.81 | 25.37 | 16.91 |
| 910 | 17.15 | 17.71 | 16.27 |

As shown in Table 3, the lowest link bandwidth (BW) calculated is 16.27 GHz. This lowest link bandwidth value sets the limit of fiber bandwidth requirement for the transceiver. Therefore, this lowest link bandwidth value is reinserted back into equation (1) as the link bandwidth (BW), along with the chromatic dispersion (CD), linewidth (Δλ), and the different fiber lengths (e.g., z=70 m, 100 m, 150 m), as disclosed above, to determine the corresponding EMB values. The results are shown in Table 4, which provide the EMB requirements (bandwidth requirement $BW_R$) for a fiber to reach each of these lengths. The calculated EMB values, as shown in Table 4, provide the bandwidth requirement $BW_R$ and, thus, provide the EMB standards for a multimode optical fiber to be optimized for a more rigorous OM-standard.

TABLE 4

| | Bandwidth Requirement $BW_R$ | | |
| --- | --- | --- | --- |
| Wavelength (nm) | EMB Required for 70 m MMF (MHz · km) | EMB Required for 100 m MMF (MHz · km) | EMB Required for 150 m MMF (MHz · km) |
| 850 | 1213 | 1900 | 3710 |
| 910 | 1182 | 1789 | 3100 |

As shown in Table 4, an OM3 multimode optical fiber having an effective modal bandwidth (EMB) of 1900 MHz·km at 850 nm and an effective modal bandwidth (EMB) of 1789 MHz·km at 910 nm can reach a fiber length of 100 m, when using the 100G BiDi transceiver or a 400G SR4.2 transceiver. Therefore, such an OM3 multimode fiber can perform the same as an OM4 standard fiber. Furthermore, an OM4 multimode optical fiber having an effective modal bandwidth (EMB) of 3710 MHz·km at 850 nm and an effective modal bandwidth (EMB) of 3100 MHz·km at 910 nm can reach a fiber length of 150 m, when using the 100G BiDi transceiver or a 400G SR4.2 transceiver. Therefore, such an OM4 fiber can perform the same as an OM5 standard fiber. With this, new subsets of OM3 and OM4 fibers can be organized and created. For example a subset of OM3 fibers that meet the OM4 functional requirements, or a subset of OM3 fibers that meet the OM5 functional requirements, or a subset of OM4 fibers that the meet the OM5 functional requirements. As discussed above, the new subsets of fibers are determined according to the bandwidth requirements $BW_R$ calculated using equation (1).

New subsets of fibers can also be created for other transceivers (for example, other than the 100G BiDi and 400G SR4.2 transceivers discussed in the above embodiments). As another exemplary embodiment, link bandwidth (BW) values at 850 nm using 100G SR4 and 400G SR8 transceivers are calculated using equation (1). In these calculations, z is equal to 70 m for OM3 fibers and 100 m for OM4 fibers. In these embodiments, the chromatic dispersion (CD) and linewidth (Δλ) used in equation (1) are the same as those disclosed above. Furthermore, only the short wavelength $\lambda_S$ of 850 nm (and not the long wavelength $\lambda_L$) is used in the calculation with the SR4 and SR8 transceivers to determine the bandwidth requirement $BW_R$ since these transceivers operate only in the wavelength of 850 nm. The results are shown in Table 5 below.

TABLE 5

| Wavelength | Link Bandwidth (GHz) | |
| --- | --- | --- |
| (nm) | 70 m OM3 Fiber | 100 m OM4 Fiber |
| 850 | 23.81 | 25.37 |

As shown in Table 5, the lowest link bandwidth (BW) calculated is 23.81 GHz. This lowest link bandwidth value sets the limit of fiber bandwidth requirement for the transceivers. Therefore, this lowest link bandwidth is reinserted back into equation (1) as the link bandwidth (BW), along with the chromatic dispersion (CD), linewidth (Δλ), and the different fiber lengths (e.g., z=70 m, 100 m) discussed above. The results are shown in Table 6, which provide the EMB requirements (bandwidth requirement $BW_R$) for a fiber to reach each of these lengths. The calculated EMB values, as shown in Table 6, provide the bandwidth requirement $BW_R$ and, thus, provide the EMB standards for a multimode optical fiber to be optimized for a more rigorous OM-standard.

TABLE 6

| | Bandwidth Requirement $BW_R$ | |
| --- | --- | --- |
| Wavelength (nm) | EMB Required for 70 m MMF (MHz · km) | EMB Required for 100 m MMF (MHz · km) |
| 850 | 2000 | 3882 |

As shown in Table 6, an OM3 multimode optical fiber having an effective modal bandwidth (EMB) of 3882 MHz·km at 850 nm can reach a fiber length of 100 m, when using the 100G SR4 and 400G SR8 transceivers. Therefore, such an OM3 multimode fiber can perform the same as an OM4 standard fiber. New subsets of OM4 fibers can be created for 100G SR4 and 400G SR8 transceivers.

FIG. 1 provides an exemplary process 1 of creating a subset of OM3 fibers that are optimized to perform as OM4 fibers and a subset of OM3 or OM4 fibers that are optimized to perform as OM5 fibers. Process 1 first includes the step of determining the link bandwidth (BW) for the transceiver distance (step 10). This value is calculated using equation (1) and the short wavelength $\lambda_S$ and/or the long wavelength $\lambda_L$, as discussed above. In some embodiments, depending on the operating wavelengths of the transceivers, only the short wavelength $\lambda_S$ is used to determine the link bandwidth (BW). At step 20, the minimum EMB value for the transceiver distance is determined, which corresponds to the bandwidth requirement $BW_R$. This value is also calculated using equation (1). And, at step 30, the new subset of fibers are determined and created. Thus, process 1 provides a screening process to determine which fibers of a first group or set (such as those of a first OM standard) are optimized to meet the requirements of a second group or set (such as those of a second OM-standard).

Embodiments of the present disclosure include a screening process to identify a subset of fibers with optimized properties. For example, embodiments of the present disclosure include creating a subset of OM3 fibers that meet the OM4 functional and/or standard requirements when using 100G SR4, 400G SR8, 100G BiDi, and 400G SR4.2 transceivers. Embodiments of the present disclosure also include creating a subset of OM4 fibers that meet the OM5 functional and/or standard requirements when using 100G SR4, 400G SR8, 100G BiDi, and 400G SR4.2 transceivers and that meet the OM4 standards at 850 nm.

The following provides an example of selecting a subset of OM3 fibers that meet the OM4 requirements and, thus, can serve as OM4 fibers meeting 100 m distance specifications using a 100G SR4 or 400G SR8 transceiver. Using the Monte Carlo simulated fiber EMB data (as discussed below), the OM3 fibers are selected that have an EMB of 3882 MHz·km or greater at a wavelength of 850 nm. It is noted that the EMB value of 3882 MHz·km is used as the threshold because it is the calculated bandwidth requirement $BW_R$ for a 100 m multimode optical fiber, as shown above in Table 6. The OM3 fibers with an EMB of less than 3882 MHz·km at a wavelength of 850 nm are considered "fail" fibers, while the OM3 fibers with an EMB of 3882 MHz·km or greater at a wavelength of 850 nm are considered "pass" fibers. The "pass" fibers are those that meet the OM4 requirements and can serve as OM4 fibers meeting 100 m distance specifications.

As is known in the art, Monte Carlo simulation is a class of algorithms that rely on repeated random sampling. For purposes of this disclosure, the refractive index profiles of the fibers were simulated by randomizing the refractive index values in different regions of the fibers, such as at the centerline and the bulk of the core, and by varying the alpha value of the overall fiber profile shape. For example, 10,000 random cases were simulated to obtain the refractive index profiles. From this data, the bandwidths of the fibers were calculated. As discussed in the example above, the bandwidths of the OM3 fibers were calculated at a wavelength of 850 nm.

The following provides an example of selecting a subset of OM4 fibers that meet the OM5 requirements and, thus, can serve as OM5 fibers meeting 150 m distance specifications using a 100G BiDi transceiver or a 400G SR4.2 transceiver. Using the Monte Carlo simulated fiber EMB data (as discussed above), the OM4 fibers are selected that have an EMB of 3100 MHz·km or greater at a wavelength of 910 nm. It is noted that the EMB value of 3100 MHz·km is used as the threshold because it is the calculated bandwidth requirement $BW_R$ for a 150 m multimode optical fiber, as shown above in Table 4. The OM4 fibers with an EMB of less than 3100 MHz·km at a wavelength of 910 nm are considered "fail" fibers, while the OM4 fibers with an EMB of 3100 MHz·km or greater at a wavelength of 910 nm are considered "pass" fibers. The "pass" fibers are those that meet the OM5 requirements and can serve as OM5 fibers meeting 150 m distance specifications.

The above disclosed embodiments (as discussed with reference to the Tables above) provide a first embodiment to select a subset of fibers with optimized properties. A second exemplary process is provided below that uses peak wavelength to identify a subset of fibers with optimized properties.

In the second exemplary process, both effective modal bandwidth (EMB) and peak wavelength are evaluated in order to determine which fibers are optimized for a higher OM standard (and, thus, are considered "pass" fibers). The effective modal bandwidth at 850 nm may provide a first threshold requirement in order to determine which fibers are "pass" fibers. This first threshold requirement may be the bandwidth requirement $BW_R$ calculated using equation (1) and the first exemplary process discussed above. Furthermore, the peak wavelength of the fibers may provide a second threshold requirement in order to determine which fibers are "pass" fibers. The "pass" fibers must meet both the first and second thresholds requirements.

Figure 2A:
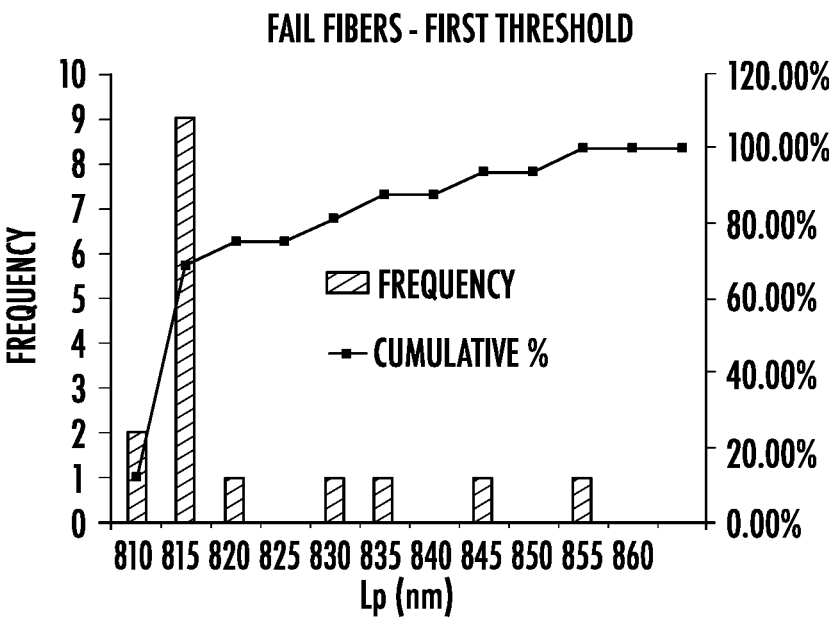
FIGS. 2A and 2B provide a comparison of the frequency of "fail" fibers versus "pass" fibers as a function of peak wavelength, according to embodiments of the present disclosure.
Figure 2B:
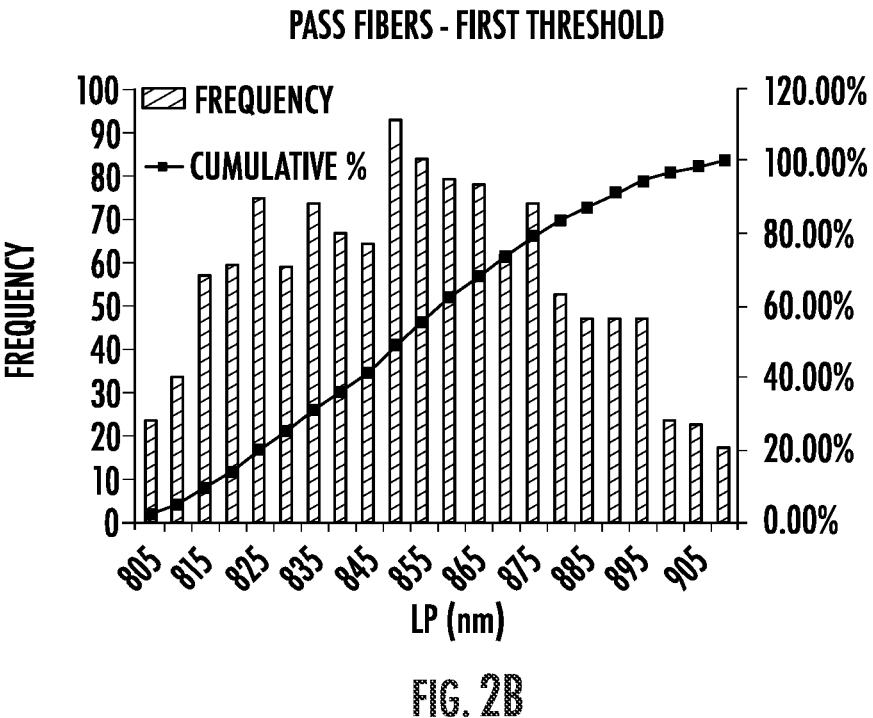

In one example, FIGS. 2A and 2B plot the peak wavelength of a group of OM3 fibers in order to determine which fibers are optimized for the OM4 standards, using a 100G BiDi transceiver or a 400G SR4.2 transceiver. The fibers plotted in FIGS. 2A and 2B were already evaluated with regards to the first threshold requirement. Therefore, the "fail" fibers in FIG. 2A did not meet the first threshold requirement, while the "pass" fibers in FIG. 2B did meet the first threshold requirement. In this embodiment, the first threshold was an effective modal bandwidth (EMB) of 1900 MHz·km or greater at 850 nm, as determined above in Table 4.

As discussed above, the second threshold requirement is based upon the peak wavelength of the fibers. As shown in FIG. 2A, none of the "fail" fibers in this embodiment have a peak wavelength of 860 nm or above. Therefore, the fibers with a peak wavelength of 860 nm or greater are all considered "pass" fibers. These "pass" fibers are all OM3 fibers that are optimized for OM4 standards. A peak wavelength of 860 nm therefore provides the second threshold requirement to determine which fibers of a group or set of OM3 multimode optical fibers are optimized for the more rigorous OM4 standards. In this embodiment, the peak wavelength of 860 nm provides the second threshold such that the fibers must have a peak wavelength at or above this second threshold in order to be considered "pass" fibers. The fibers must meet the requirements of both the first and second thresholds in order to be considered "pass" fibers that are optimized for the higher OM standard.

Figure 3:
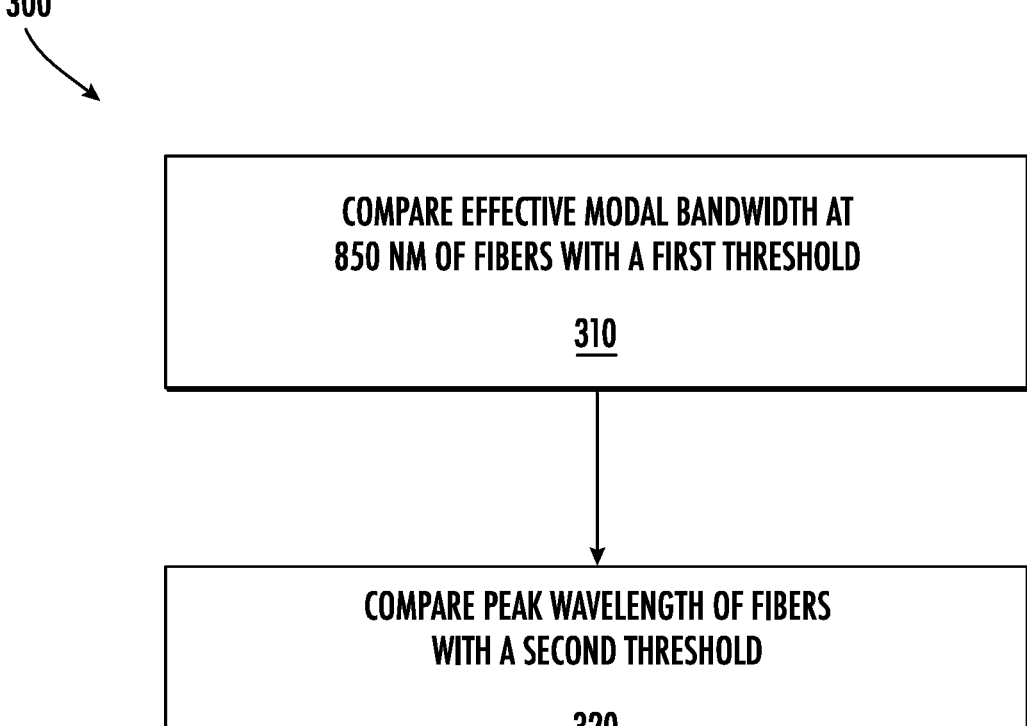
FIG. 3 provides another exemplary process for selecting an optimized multimode optical fiber, according to embodiments of the present disclosure.

Process 300 of FIG. 3 provides a flow chart of the second exemplary process disclosed herein, which categorizes and creates a subset of optimized fibers from a group of like multimode optical fibers. In step 310, the effective modal bandwidth at 850 nm of each fiber in a group of like multimode optical fibers (e.g., a group of OM3 fibers or a group of OM4 fibers) is compared with a first threshold. Fibers with an effective modal bandwidth at 850 nm below the first threshold may be considered "fail" fibers. Fibers with an effective modal bandwidth at 850 nm equal to or above the first threshold are further evaluated with respect to their peak wavelength to determine if they are "pass" fibers.

In step 320 of process 300, the peak wavelength of each fiber in the group or set of like multimode optical fibers (e.g., the group of OM3 fibers or the group of OM4 fibers) is compared with a second threshold. As discussed above with reference to FIGS. 2A and 2B, in some embodiments the second threshold is a peak wavelength of 860 nm. Fibers with a peak wavelength below the second threshold may be considered "fail" fibers that are not optimized for the higher OM-standard. Fibers with a peak wavelength that meet or that are above the second threshold may be considered "pass" fibers that are optimized for the higher OM-standard. As discussed above, the fibers must meet both the first and second thresholds of steps 310 and 320 in order to be considered "pas" fibers.

Figure 4A:
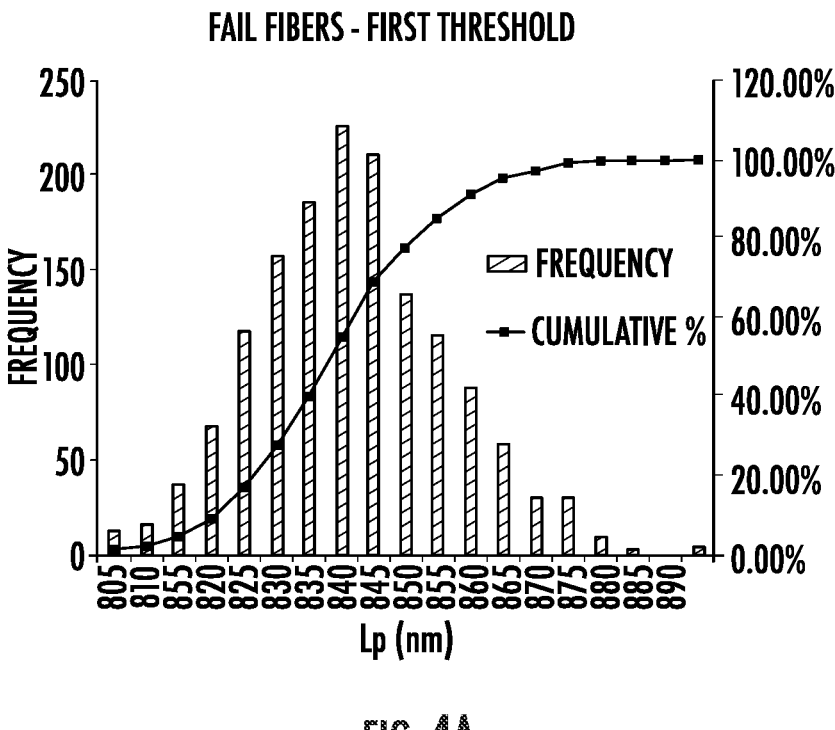
FIGS. 4A and 4B provide another comparison of the frequency of "fail" fibers versus "pass" fibers as a function of peak wavelength, according to embodiments of the present disclosure.
Figure 4B:
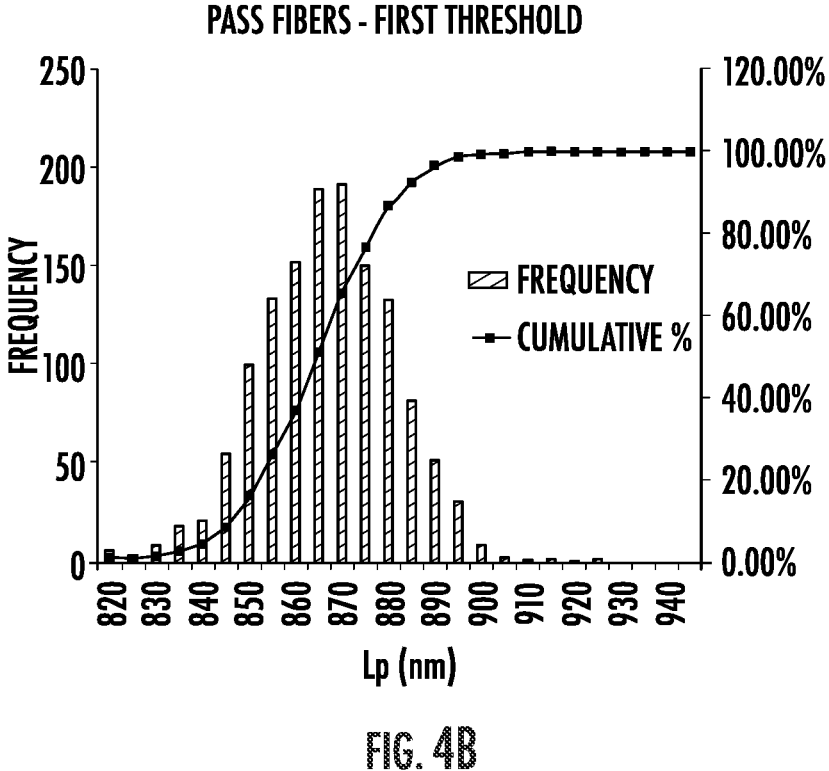

FIGS. 4A and 4B show another example of the second exemplary process disclosed herein. FIGS. 4A and 4B plot the peak wavelength of a group of OM4 fibers in order to determine which fibers are optimized for the OM5 standards, using a 100G BiDi transceiver or a 400G SR4.2 transceiver. The fibers plotted in FIGS. 4A and 4B were already evaluated with regards to the first threshold requirement. Therefore, the "fail" fibers in FIG. 4A did not meet the first threshold requirement, while the "pass" fibers in FIG. 4B did meet the first threshold requirement. In this embodiment, the first threshold was an effective modal bandwidth (EMB) of 1900 MHz·km or greater at 850 nm, as determined above in Table 4.

As shown in FIG. 4A, a majority of the "fail" fibers have a peak wavelength of 880 nm or lower. Therefore, the second threshold in this embodiment is a peak wavelength of greater than 880 nm. One can therefore select fibers with a peak wavelength of above 880 nm as being a subset of OM4 fibers that perform as OM5 fibers (the "pass" fibers). Although this embodiment uses the peak wavelength of 880 nm as the second threshold, it is also noted that other wavelengths can be used for the second threshold such as, for example, peak wavelengths of 750 nm, or 760 nm, or 850 nm.

Figure 5:
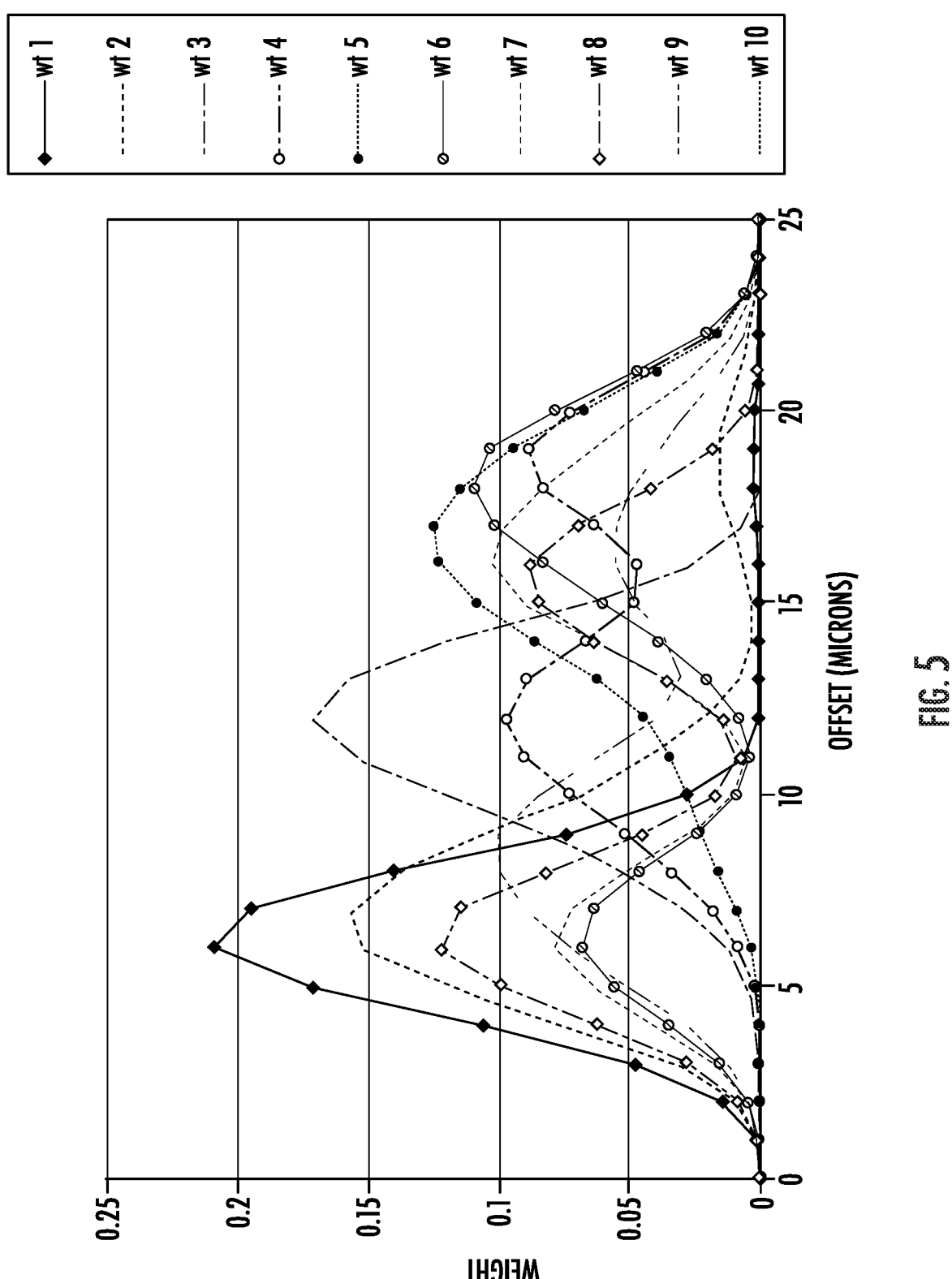
FIG. 5 provides a plot of 10 EMB weights with their corresponding launch offsets for a multimode optical fiber, according to embodiments of the present disclosure.
Figure 6:
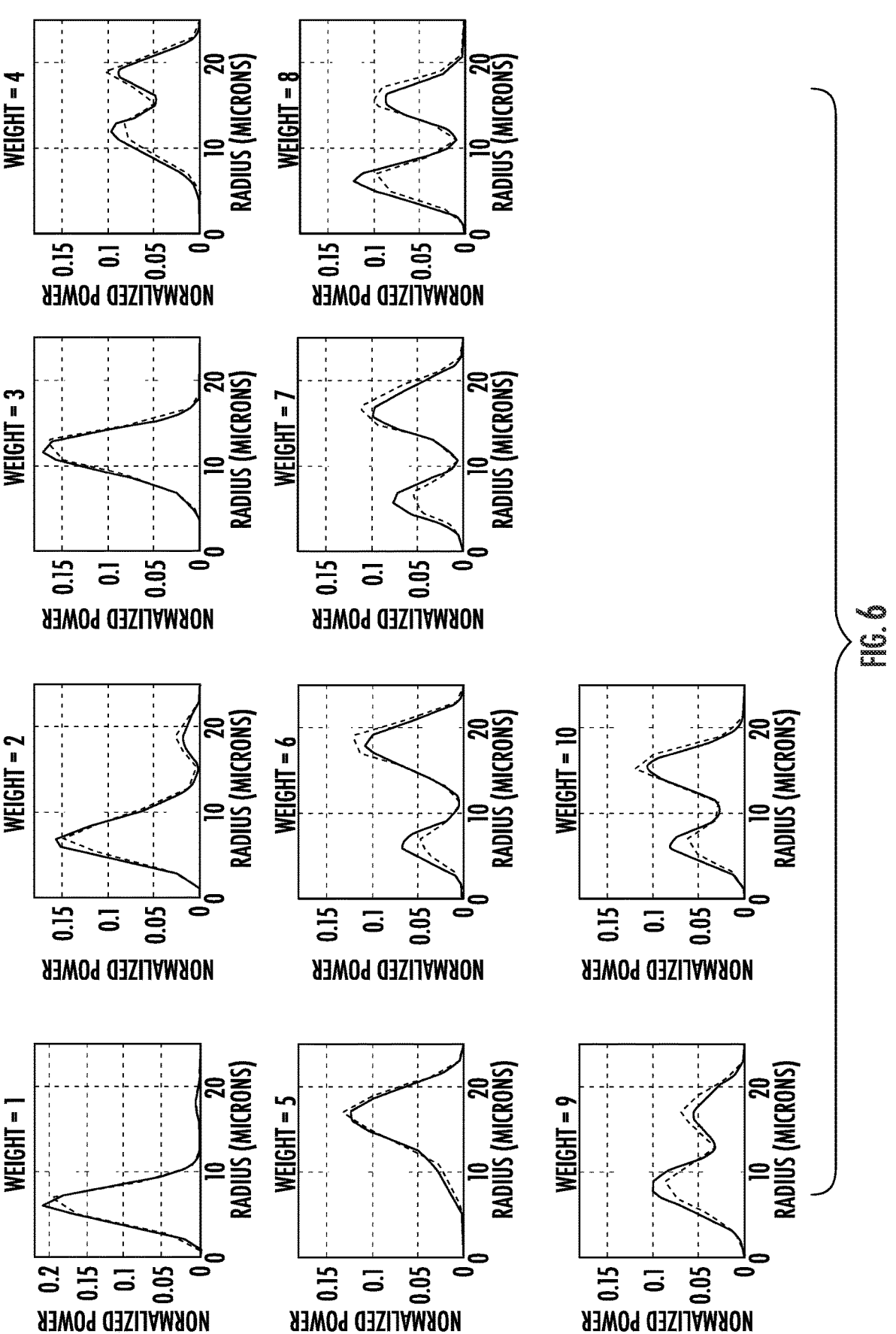
FIG. 6 shows the impact of the 10 EMB weights on the modal bandwidth of a multimode optical fiber, according to embodiments of the present disclosure.

However, some fibers with a peak wavelength below 880 nm are incorrectly shown as "fail" fibers in FIG. 4A. More specifically, as shown in FIG. 4B, some fibers with a peak wavelength below 880 nm are actually "pass" fibers. Additionally, with reference to FIGS. 2A and 2B, some fibers with a peak wavelength below 860 nm (the second threshold) are incorrectly shown as "fail" fibers and are actually "pass" fibers." Therefore, the embodiments of the present disclosure include a third exemplary process to provide the subset of optimized fibers that involves the 10 EMB weights. With the third exemplary process, the effective modal bandwidth (EMB) of a multimode fiber is calculated using 10 EMB weights, or 10 assumed launch conditions that are weighted radially by power. FIG. 5 shows a plot of the 10 EMB weights with their corresponding launch offsets. The 10 EMB weights each have a different impact on the modal bandwidth of the multimode optical fiber based on the error in a refractive index profile from an ideal target alpha profile. For example, as shown in FIG. 6, the bandwidths of weights 1 and 2 are affected by refractive index errors in the center of the core (as compared to the ideal target alpha profile). However, the bandwidth of weight 5 is more affected by refractive index errors in the outside of the core (as compared to the ideal target alpha profile), which affect the higher order mode groups. As the error in index profile varies in different radial locations of the core, causing deviations from an ideal alpha profile, it can result in fibers that are limited by different EMB weights.

Figure 7:
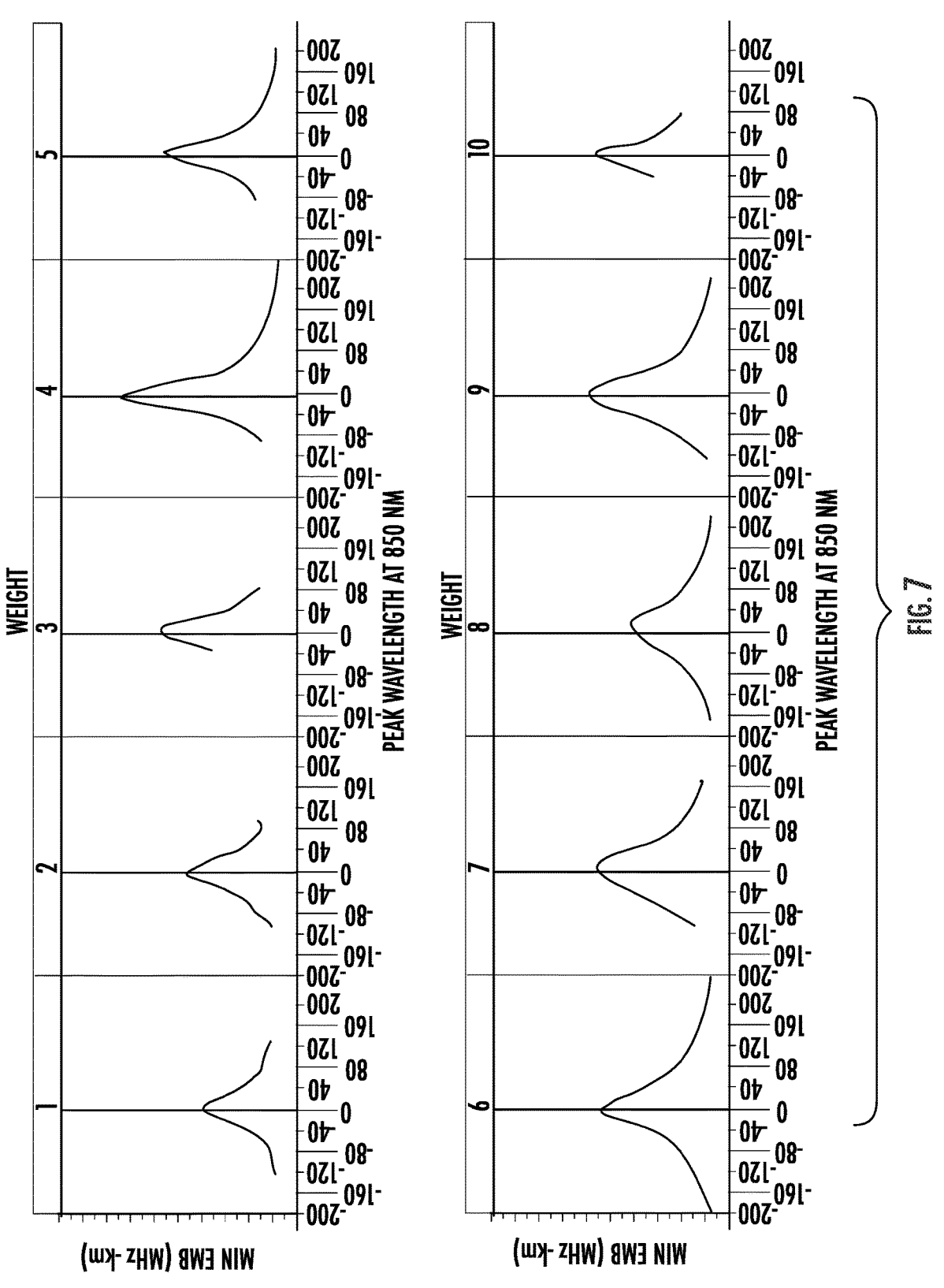
FIG. 7 shows the deviation of peak wavelength from a target wavelength from the different EMB weights for a multimode optical fiber, according to embodiments of the present disclosure.

The different EMB weights each affect the EMB requirements (the bandwidth requirement $BW_R$) of a fiber, as discussed above with regard to Tables 4 and 6. For example, FIG. 7 shows how EMB measured at a wavelength of 850 nm changes as the peak wavelength deviates from 850 nm for the different EMB weights. The relation of how the peak wavelength deviates from the target wavelength is used to determine how far a fiber can be from the peak wavelength and still achieve the desired modal bandwidth capabilities.

In this third exemplary process, the effective modal bandwidth (EMB) for each of the 10 EMB weights is measured for each fiber in a group of set of like multimode optical fibers (e.g., a group of OM3 fibers or a group of OM4 fibers). The specific weights are then chosen that have the most limiting effect on the effective modal bandwidths (EMB). In one example, the specific weights of 1, 6, and 7 are chosen since those weights corresponded to the lowest measured effective modal bandwidths (min EMB) for the group of fibers. As another example, the fibers are limited by weights 4, 7, and 9 since these weights provided the lowest measured effective modal bandwidths (min EMB).

Figure 8:
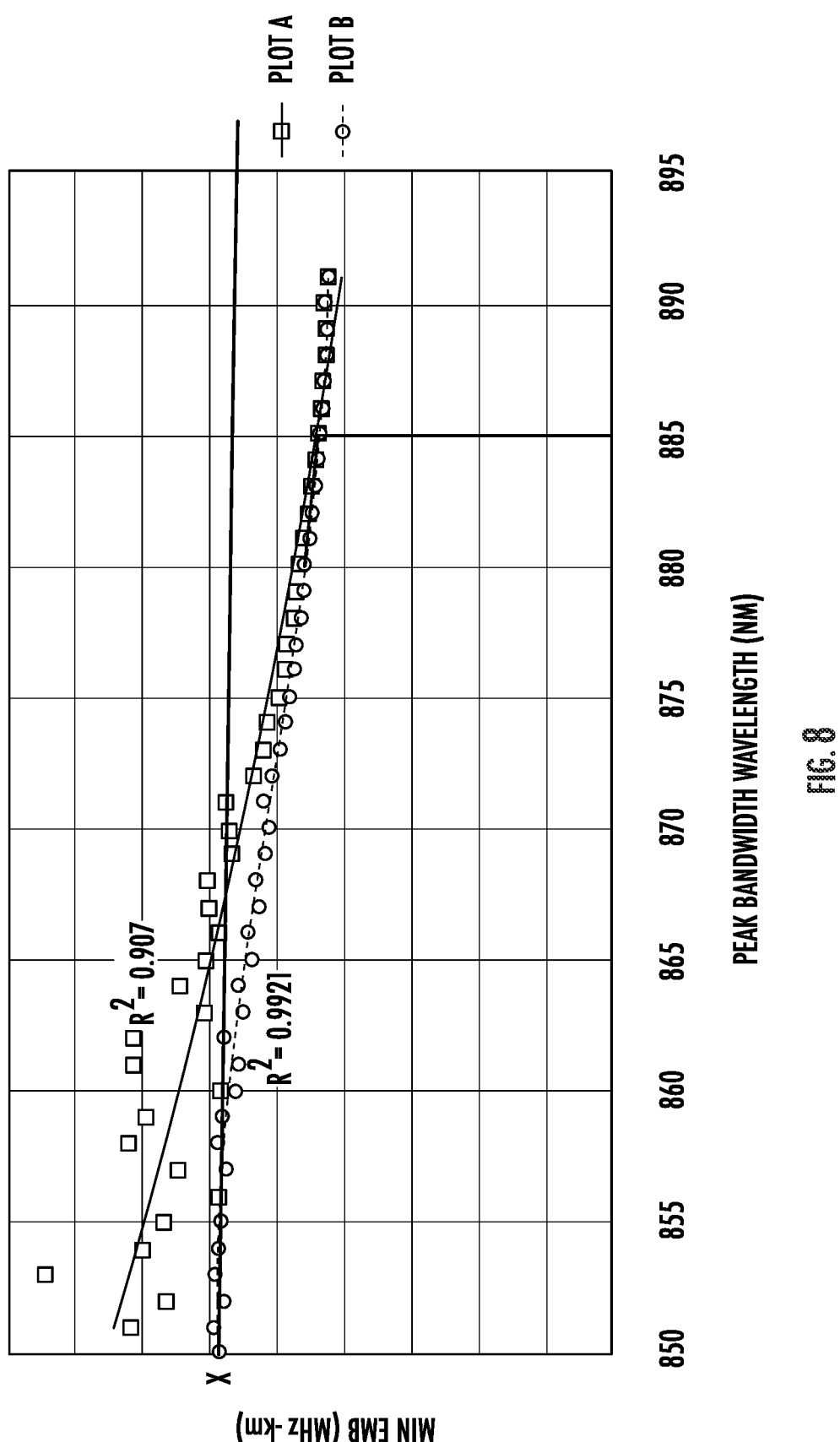
FIG. 8 provides a plot of the minimum EMB vs. peak bandwidth wavelength starting at a wavelength of 850 nm.

Next, in the third exemplary process, the measured minimum effective modal bandwidths (min EMB) at 850 nm for a group of OM4 fibers is plotted vs. peak wavelength, as shown in FIG. 8. In particular, FIG. 8 shows a plot of the minimum effective modal bandwidth (min EMB) at 850 nm vs. peak bandwidth wavelength for the group of OM4 fibers. Plot A corresponds to the group of fibers when affected by weights 4, 7, and 9, and plot B corresponds to the group of fibers when affected by all 10 EMB weights. In this embodiment, the OM4 fibers with a peak wavelength above 880 nm are considered to be "pass" fibers that meet the criteria for OM5 standard fibers. Therefore, 880 nm is the second threshold (FIG. 3) for the subset of OM4 fibers that meet the OM5 standards. However, as discussed above, some fibers with a peak wavelength below the second threshold may actually be "pass" fibers. Therefore, when relying on just the first and second thresholds, as discussed above with reference to FIG. 3, some fibers may be inaccurately classified as "fail" fibers. FIG. 8 provides an example of the third embodiment disclosed herein, which is a method to classify and determine the "pass" and "fail" fibers.

As discussed above, plot A corresponds to the group of fibers when affected by weights 4, 7, and 9, and plot B corresponds to the group of fibers when affected by all 10 EMB weights. The fibers of plot A have a higher peak bandwidth wavelength than the fibers of plot B at the same minimum effective modal bandwidth. For example as shown in FIG. 8, at the same minimum effective modal bandwidth (shown by line X for one particular example), the fibers of plot A have a peak bandwidth wavelength of about 867 nm while the fibers of plot B have a peak bandwidth wavelength of only about 858 nm. Because the fibers of plot A achieve the same minimum effective modal bandwidth as those of plot B but with a higher peak bandwidth wavelength, the fibers of plot A have an increased rate of being "pass" fibers compared to the fibers of plot B. Stated another way, the peak bandwidth wavelength of plot A is closer to 953 nm so that the fibers of plot A have a higher chance of passing at the 953 nm wavelength threshold. Conversely, the fibers of plot B have an increased rate of being "fail" fibers compared to the fibers of plot A. Therefore, only the effective modal bandwidth at 953 nm is calculated for the fibers of plot A since they have the increased rate of being "pass" fibers.

As is known in the art, OM5 fibers must have an EMB at 850 nm of at least 4700 MHz·km and an EMB at 953 nm of at least 2470 MHz·km. Therefore, only the effective modal bandwidth of the fibers of plot A are measured to determine if they have an EMB of at least 2470 MHz·km at 953 nm. The fibers that meet this EMB requirement are determined to be "pass" fibers. Furthermore, the fibers of plot B may all be classified as "fail" fibers and discarded. Such reduces time and resources by only measuring the effective modal bandwidth of fibers with an increased rate of being "pass" fibers.

Figure 9:
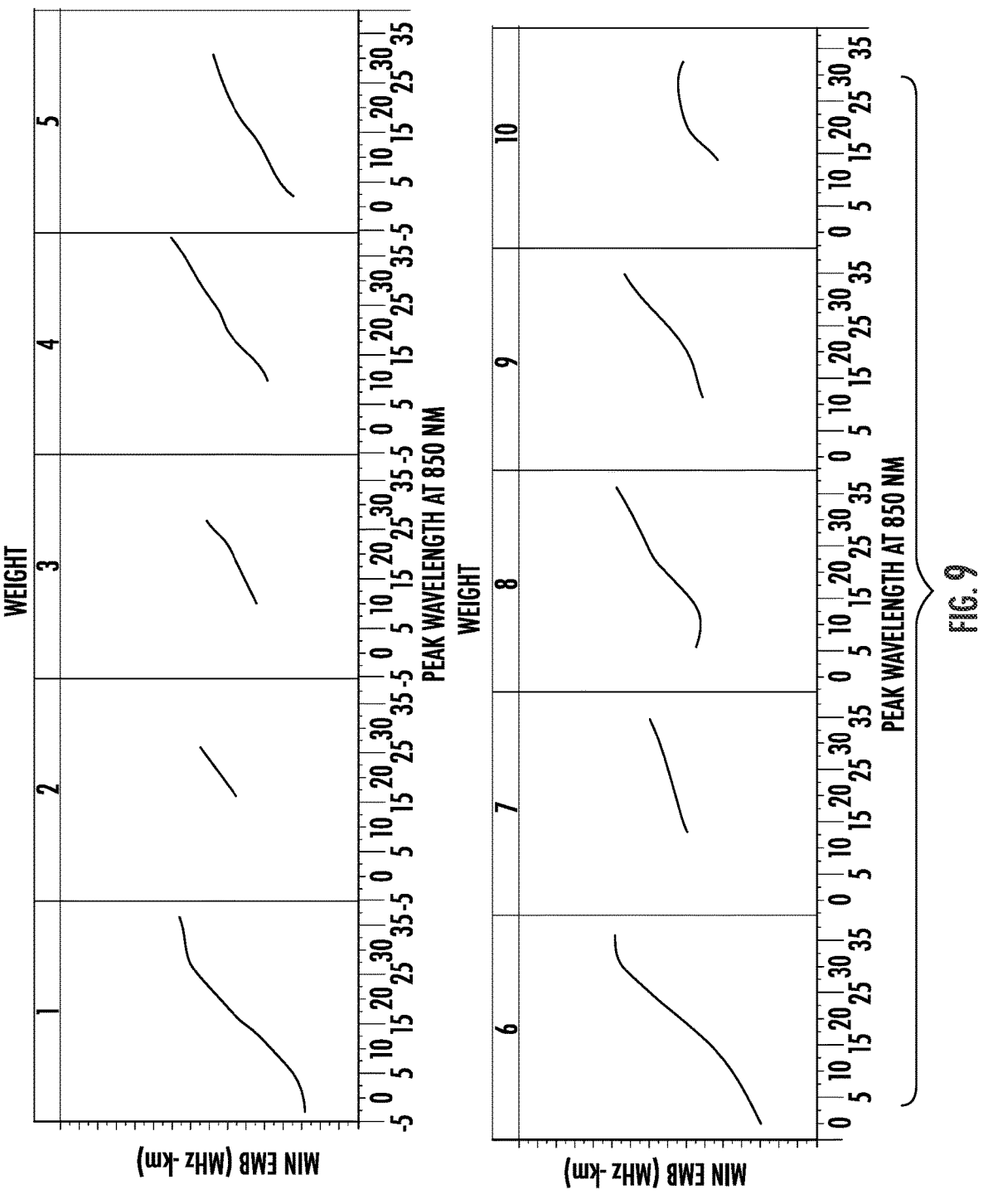
FIG. 9 shows how EMB changes as the peak wavelength deviates from a target wavelength for a multimode optical fiber, according to embodiments of the present disclosure.

According to another example of the third exemplary process, another method to efficiently select fibers that the meet the OM5 standards is provided. As discussed above, the different EMB weights each affect the EMB requirements (bandwidth requirement $BW_R$) of a fiber. FIG. 9 shows how effective modal bandwidth (EMB) measured at a wavelength of 953 nm changes as the peak wavelength deviates from 850 nm for the different EMB weights. The relation of how the peak wavelength deviates from the target wavelength is used to determine how far a fiber can be from the peak wavelength and still achieve the desired modal bandwidth capabilities.

Figure 10:
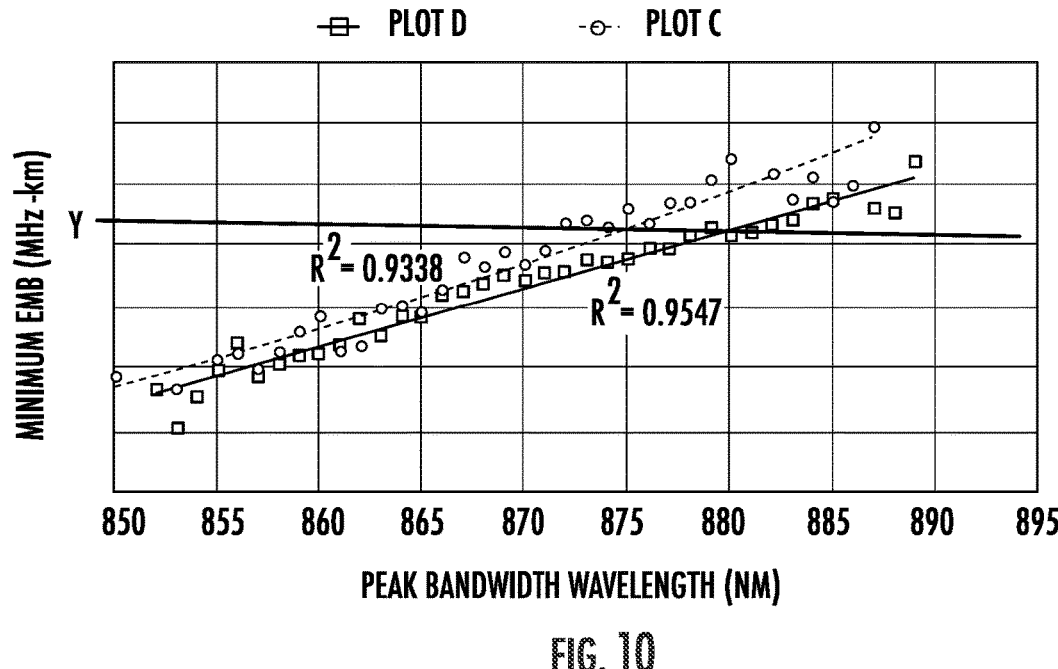
FIG. 10 provides a plot of the minimum EMB vs. peak bandwidth wavelength starting at a wavelength of 850 nm, according to embodiments of the present disclosure.

As an example, a group of OM4 fibers are limited by weights 6, 7, and 8 to determine a peak wavelength range from which the fiber can deviate from the peak wavelength and still achieve the desired modal bandwidth capabilities. FIG. 10 provides a plot of the measured effective modal bandwidths (EMB) at 850 nm vs. peak bandwidth wavelength for the group of OM5 fibers. Plot C corresponds to the group of fibers when affected by weights 6, 7, and 8, and plot D corresponds to the group of fibers when affected by weights 1-5. The fibers of plot D have a higher peak bandwidth wavelength than the fibers of plot C at the same minimum effective modal bandwidth. For example as shown in FIG. 10, at the same minimum effective modal bandwidth (shown by line Y for one particular example), the fibers of plot D have a peak bandwidth wavelength of about 880 nm while the fibers of plot C have a peak bandwidth wavelength of only about 875 nm. Because the fibers of plot D achieve the same minimum effective modal bandwidth as those of plot C but with a higher peak bandwidth wavelength, the fibers of plot D have an increased rate of being "pass" fibers compared to the fibers of plot C. Stated another way, the peak bandwidth wavelength of plot D is closer to 953 nm so that the fibers of plot D have a higher chance of passing at the 953 nm wavelength threshold. Conversely, the fibers of plot C have an increased rate of being "fail" fibers compared to the fibers of plot D. Therefore, only the effective modal bandwidth at 953 nm is calculated for the fibers of plot D since they have the increased rate of being "pass" fibers.

As is known in the art, OM5 fibers must have an EMB at 850 nm of at least 4700 MHz·km and an EMB at 953 nm of at least 2470 MHz·km. Therefore, only the effective modal bandwidth of the fibers of plot D are measured to determine if they have an EMB of at least 2470 MHz·km at 953 nm. The fibers that meet this EMB requirement are determined to be "pass" fibers. Furthermore, the fibers of plot C may all be classified as "fail" fibers and discarded. Such reduces time and resources by only measuring the effective modal bandwidth of fibers with an increased rate of being "pass" fibers.

Figure 11:
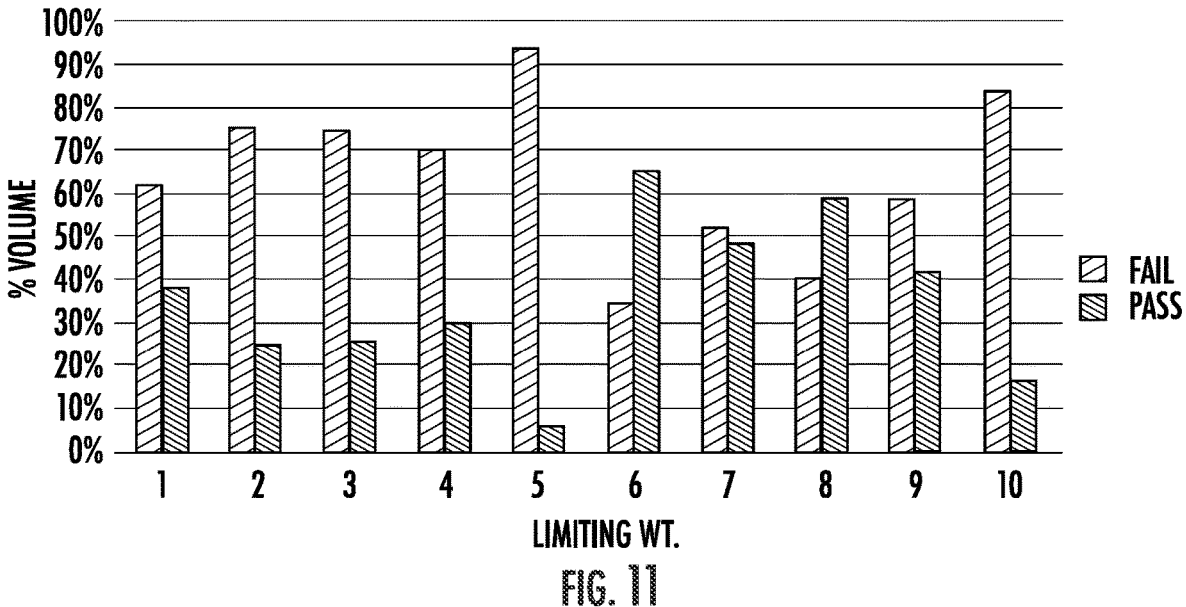
FIG. 11 shows the percent volume of "pass" fibers compared to "fail" fibers when limited by the 10 EMB weights, according to embodiments of the present disclosure.

These results are also supported by the percent of fibers passing for OM5 standard fibers with minimum effective modal bandwidth (min EMB) at 953 nm requirements, as shown in FIG. 11. In this figure, fibers with weights 1-5 have a lower pass rate compared to fibers with weights 6-8 for a similar peak wavelength range.

As an example, 117 OM4 fibers were measured with limiting weights of 6-9. The percent pass rate of OM5 standard fibers was 54%, as compared to only a 30% pass rate with the current selection process. This example further illustrates the higher pass rate of adding limiting weights as a selection criteria to the current selection process to improve OM5 yields and to have fewer fibers measured at 953 nm.

FIG. 12 provides an exemplary process 1000 for a method of selecting a fiber, according to embodiments of the present disclosure. At step 1100, a fiber is measured to obtain DMD data at a first wavelength of 850 nm (the first threshold). At step 1200, it is determined if the fiber meets the OM4 standard requirements based upon the DMD data. If the fiber does not meet the OM4 standard requirements (step 1200—no), the fiber is not selected, as shown at step 1300. If the fiber does meet the OM4 standard requirements (step 1200—yes), it is then determined at step 1400 if the fiber meets the current OM5 standard requirements (for example, using the second threshold). If the fiber does not meet the current OM5 selection criteria (step 1400—no), the fiber is not selected, as shown at step 1500. If the fiber does meet the current OM5 selection criteria (step 1400—yes), it is then determined at step 1600 if the fiber meets the 850 nm DMD weight limiting criteria (using the minimum effective modal bandwidths with the 10 EMB weights). If the fiber does not meet the weight limiting criteria (step 1600—no), the fiber is not selected, as shown at step 1700. If the fiber does meet the weight limiting criteria (step 1600—yes), the fiber is then selected for measurements at a second wavelength of 953 nm (the long wavelength $\lambda_L$).

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system embodiments other than those described herein.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. A method of categorizing a group of multimode optical fibers, the method comprising:

comparing an effective modal bandwidth of a first multimode optical fiber with a first threshold, the first multimode optical fiber being in a group of multimode optical fibers meeting a first OM-standard, the first threshold being an effective modal bandwidth of the first multimode optical fiber; and categorizing the first multimode optical fiber as meeting OM functional requirements of a second OM-standard if the effective modal bandwidth of the first multimode optical fiber is equal to or above the first threshold, wherein the second OM-standard is higher than the first OM-standard.

2. The method of claim 1, wherein the OM functional requirements of the second OM-standard include distance and transceiver reach requirements.

3. The method of claim 1, wherein the first threshold is an effective modal bandwidth at 850 nm.

4. The method of claim 3, wherein the first threshold is an effective modal bandwidth of 1900 MHz·km at 850 nm.

5. The method of claim 1, further comprising comparing a peak wavelength of the first multimode optical fiber with a second threshold.

6. The method of claim 5, further comprising categorizing the first multimode optical fiber as meeting the OM functional requirements of the second OM-standard if the peak wavelength of the first multimode optical fiber is equal to or above the second threshold.

7. The method of claim 5, wherein the second threshold is a peak wavelength of 760 nm.

8. The method of claim 5, wherein the second threshold is a peak wavelength of 850 nm.

9. The method of claim 5, wherein the second threshold is a peak wavelength of 880 nm.

10. The method of claim 1, further comprising calculating the link bandwidth of the first multimode optical fiber using equation (1) to calculate the effective modal bandwidth:

$$BW = 1 / \left[ z \cdot \sqrt{\frac{1}{EMB^2} + 28.4777 \cdot CD^2 \cdot \Delta\lambda^2} \right] \qquad (1)$$

wherein BW is link bandwidth, z is the fiber length (km), EMB is the effective modal bandwidth (MHz·km), CD is the chromatic dispersion (ps/nm/km), and $\Delta\lambda$ is the linewidth of a transceiver used with the fiber.

11. The method of claim 10, wherein the link bandwidth is calculated using a short wavelength and a long wavelength.

12. The method of claim 11, wherein the short wavelength is 850 nm and the long wavelength is 910 nm.

13. The method of claim 1, further comprising limiting the first multimode optical fiber with one or more of the 10 EMB weights.

14. The method of claim 1, wherein the first OM-standard is an OM3-standard and the second OM-standard is an OM4-standard.

15. The method of claim 1, wherein the first OM-standard is an OM3-standard and the second OM-standard is an OM5-standard.

16. The method of claim 1, wherein the first OM-standard is an OM4-standard and the second OM-standard is an OM5-standard.

17. A method of categorizing a group of multimode optical fibers, the method comprising:

comparing an effective modal bandwidth of a first multimode optical fiber with a first threshold, the first multimode optical fiber being in a group of multimode optical fibers meeting a first OM-standard, the first threshold being an effective modal bandwidth of the first multimode optical fiber; and categorizing the first multimode optical fiber as meeting OM standard requirements of a second OM-standard if the effective modal bandwidth of the first multimode optical fiber is equal to or above the first threshold, wherein the second OM-standard is higher than the first OM-standard.

18. The method of claim 17, wherein the OM standard requirements of the second OM-standard include ISO classification requirements of the second OM-standard.

19. The method of claim 17, wherein the first threshold is an effective modal bandwidth at 850 nm.

20. The method of claim 17, wherein the first threshold is an effective modal bandwidth of 1900 MHz·km at 850 nm.

* * * * *